(12) United States Patent
Zhang et al.

(10) Patent No.: US 8,250,062 B2
(45) Date of Patent: Aug. 21, 2012

(54) OPTIMIZED STREAMING EVALUATION OF XML QUERIES

(75) Inventors: Ning Zhang, Belmont, CA (US); Sivasankaran Chandrasekar, Menlo Park, CA (US); Nipun Agarwal, Santa Clara, CA (US); Sam Idicula, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 577 days.

(21) Appl. No.: 11/938,017

(22) Filed: Nov. 9, 2007

(65) Prior Publication Data

US 2009/0125495 A1 May 14, 2009

(51) Int. Cl.
*G06F 7/00* (2006.01)
*G06F 17/00* (2006.01)

(52) U.S. Cl. .................. 707/713; 707/715; 707/716

(58) Field of Classification Search ............... 707/1–206
See application file for complete search history.

(56) References Cited

U.S. PATENT DOCUMENTS

| | | | |
|---|---|---|---|
| 5,295,261 A | 3/1994 | Simonetti | |
| 5,404,513 A | 4/1995 | Powers et al. | |
| 5,467,471 A | 11/1995 | Bader | |
| 5,680,614 A | 10/1997 | Bakuya et al. | |
| 5,724,577 A | 3/1998 | Exley et al. | |
| 5,734,887 A | 3/1998 | Kingberg et al. | |
| 5,780,830 A | 7/1998 | Boie et al. | |
| 5,878,415 A | 3/1999 | Olds | |
| 5,974,407 A | 10/1999 | Sacks | |
| 5,987,506 A | 11/1999 | Carter et al. | |
| 5,991,713 A | 11/1999 | Unger et al. | |
| 6,003,040 A | 12/1999 | Mital et al. | |
| 6,018,747 A | 1/2000 | Burns et al. | |
| 6,038,563 A | 3/2000 | Bapat et al. | |
| 6,055,544 A | 4/2000 | DeRose et al. | |
| 6,061,684 A | 5/2000 | Glasser et al. | |

(Continued)

FOREIGN PATENT DOCUMENTS

EP 1 241 589 A2 9/2002

(Continued)

OTHER PUBLICATIONS

Peer to Patent, Third Party submission for PGPUB 20090125495, "Optimized streaming evaluation of xml queries", Sep. 1, 2009.*

(Continued)

*Primary Examiner* — Angelica Ruiz
(74) *Attorney, Agent, or Firm* — Hickman Palermo Truong Becker Bingham Wong LLP; Karl T. Rees

(57) ABSTRACT

A database system may perform a streaming evaluation of an XPath expression by utilizing an XPath evaluation component in tandem with an XML event-streaming component. For a more optimal filtered streaming evaluation, the XML event-streaming component may provide an interface whereby the evaluation component sends certain criteria to the event-streaming component when requesting an XML event. The criteria may be based on a next unmatched step in the XPath expression. In response to the request for an XML event, the event-streaming component may only return events that match the criteria. The evaluation component may be, for example, a compiled state machine for the XPath expression. The criteria may be pre-compiled for each possible state in the state machine. The event-streaming component may also utilize the criteria along with schema information to skip parsing of certain segments of XML data.

56 Claims, 7 Drawing Sheets

U.S. PATENT DOCUMENTS

| | | | |
|---|---|---|---|
| 6,128,610 A | 10/2000 | Srinivasan et al. | |
| 6,141,655 A | 10/2000 | Johnson et al. | |
| 6,154,741 A | 11/2000 | Feldman | |
| 6,189,012 B1 | 2/2001 | Mital et al. | |
| 6,199,195 B1 | 3/2001 | Goodwin et al. | |
| 6,208,993 B1 | 3/2001 | Shadmon | |
| 6,236,988 B1 | 5/2001 | Aldred | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,343,287 B1 | 1/2002 | Kumar et al. | |
| 6,356,920 B1 | 3/2002 | Vandersluis | |
| 6,366,934 B1 | 4/2002 | Cheng et al. | |
| 6,370,537 B1 | 4/2002 | Gilbert et al. | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,523,062 B1 | 2/2003 | Bridgman et al. | |
| 6,539,398 B1 | 3/2003 | Hannan et al. | |
| 6,571,231 B2 | 5/2003 | Sedlar | |
| 6,598,055 B1 | 7/2003 | Keesey et al. | |
| 6,604,100 B1 | 8/2003 | Fernandez et al. | |
| 6,609,121 B1 | 8/2003 | Ambrosini et al. | |
| 6,635,088 B1 | 10/2003 | Hind et al. | |
| 6,636,845 B2 | 10/2003 | Chau et al. | |
| 6,643,633 B2 | 11/2003 | Chau et al. | |
| 6,662,342 B1 | 12/2003 | Marcy | |
| 6,684,227 B2 | 1/2004 | Duxbury | |
| 6,704,739 B2 | 3/2004 | Craft et al. | |
| 6,704,747 B1 | 3/2004 | Fong | |
| 6,708,186 B1 | 3/2004 | Claborn et al. | |
| 6,718,322 B1 | 4/2004 | Brye | |
| 6,725,212 B2 | 4/2004 | Couch et al. | |
| 6,754,661 B1 | 6/2004 | Hallin et al. | |
| 6,772,350 B1 | 8/2004 | Belani et al. | |
| 6,785,673 B1 | 8/2004 | Fernandez et al. | |
| 6,801,224 B1 | 10/2004 | Lewallen | |
| 6,826,727 B1 | 11/2004 | Mohr et al. | |
| 6,836,778 B2 | 12/2004 | Manikutty et al. | |
| 6,836,857 B2 | 12/2004 | Ten-Hove et al. | |
| 6,883,137 B1 | 4/2005 | Girardot et al. | |
| 6,920,457 B2 | 7/2005 | Pressmar | |
| 6,964,025 B2 | 11/2005 | Angiulo et al. | |
| 6,966,029 B1 | 11/2005 | Ahern | |
| 7,013,425 B2 | 3/2006 | Kataoka | |
| 7,031,956 B1 | 4/2006 | Lee et al. | |
| 7,043,488 B1 | 5/2006 | Bauer et al. | |
| 7,080,094 B2 | 7/2006 | Dapp et al. | |
| 7,089,239 B1 | 8/2006 | Baer et al. | |
| 7,089,567 B2 | 8/2006 | Girardot et al. | |
| 7,139,746 B2 | 11/2006 | Shin et al. | |
| 7,143,397 B2 | 11/2006 | Imaura | |
| 7,162,485 B2 | 1/2007 | Gottlob et al. | |
| 7,165,239 B2 | 1/2007 | Hejlsberg et al. | |
| 7,171,407 B2 | 1/2007 | Barton et al. | |
| 7,174,354 B2 | 2/2007 | Andreasson | |
| 7,318,194 B2 | 1/2008 | Achilles et al. | |
| 7,340,611 B2 | 3/2008 | Alev et al. | |
| 7,398,265 B2 | 7/2008 | Thusoo et al. | |
| 7,406,522 B2 | 7/2008 | Riddle | |
| 7,441,185 B2 | 10/2008 | Coulson et al. | |
| 7,451,128 B2 | 11/2008 | Song et al. | |
| 7,496,512 B2 | 2/2009 | Magee et al. | |
| 7,500,017 B2 | 3/2009 | Cseri et al. | |
| 7,523,119 B2* | 4/2009 | Imamura et al. | 707/101 |
| 2001/0268244 A1 | 12/2001 | Levanoni et al. | |
| 2002/0056025 A1 | 5/2002 | Qiu et al. | |
| 2002/0073019 A1 | 6/2002 | Deaton | |
| 2002/0078068 A1 | 6/2002 | Krishnaprasad et al. | |
| 2002/0116371 A1 | 8/2002 | Dodds et al. | |
| 2002/0116457 A1 | 8/2002 | Eshleman et al. | |
| 2002/0133484 A1 | 9/2002 | Chau et al. | |
| 2002/0143512 A1 | 10/2002 | Shamoto et al. | |
| 2002/0156811 A1 | 10/2002 | Krupa | |
| 2002/0184188 A1 | 12/2002 | Mandyam et al. | |
| 2002/0184401 A1 | 12/2002 | Kadel, Jr. et al. | |
| 2003/0004937 A1 | 1/2003 | Salmenkaita et al. | |
| 2003/0009361 A1 | 1/2003 | Hancock et al. | |
| 2003/0033287 A1 | 2/2003 | Shanahan et al. | |
| 2003/0041302 A1 | 2/2003 | McDonald | |
| 2003/0065659 A1 | 4/2003 | Agarwal et al. | |
| 2003/0069881 A1 | 4/2003 | Huttunen | |
| 2003/0078906 A1 | 4/2003 | Ten-Hove et al. | |
| 2003/0093672 A1 | 5/2003 | Cichowlas | |
| 2003/0101194 A1 | 5/2003 | Rys et al. | |
| 2003/0140308 A1 | 7/2003 | Murthy et al. | |
| 2003/0172135 A1 | 9/2003 | Bobick et al. | |
| 2003/0182624 A1 | 9/2003 | Large | |
| 2003/0212662 A1 | 11/2003 | Shin et al. | |
| 2003/0212664 A1 | 11/2003 | Breining et al. | |
| 2003/0236903 A1 | 12/2003 | Piotrowski | |
| 2004/0010752 A1 | 1/2004 | Chan et al. | |
| 2004/0043758 A1 | 3/2004 | Sorvari et al. | |
| 2004/0044659 A1 | 3/2004 | Judd et al. | |
| 2004/0064466 A1 | 4/2004 | Manikutty et al. | |
| 2004/0088320 A1 | 5/2004 | Perry | |
| 2004/0088415 A1 | 5/2004 | Chandrasekar et al. | |
| 2004/0132465 A1 | 7/2004 | Mattila et al. | |
| 2004/0143791 A1 | 7/2004 | Ito et al. | |
| 2004/0148278 A1 | 7/2004 | Milo et al. | |
| 2004/0172599 A1 | 9/2004 | Calahan | |
| 2004/0176958 A1 | 9/2004 | Salmenkaita et al. | |
| 2004/0220912 A1 | 11/2004 | Manikutty et al. | |
| 2004/0221229 A1 | 11/2004 | Perry | |
| 2004/0225680 A1 | 11/2004 | Cameron et al. | |
| 2004/0230667 A1 | 11/2004 | Wookey | |
| 2004/0260691 A1* | 12/2004 | Desai et al. | 707/4 |
| 2004/0261019 A1* | 12/2004 | Imamura et al. | 715/513 |
| 2004/0267760 A1 | 12/2004 | Brundage et al. | |
| 2005/0033733 A1 | 2/2005 | Shadmon et al. | |
| 2005/0050016 A1 | 3/2005 | Stanoi et al. | |
| 2005/0050058 A1 | 3/2005 | Jain et al. | |
| 2005/0050092 A1 | 3/2005 | Jain et al. | |
| 2005/0060647 A1 | 3/2005 | Doan et al. | |
| 2005/0091188 A1 | 4/2005 | Pal et al. | |
| 2005/0091588 A1 | 4/2005 | Ramarao et al. | |
| 2005/0097084 A1 | 5/2005 | Balmin et al. | |
| 2005/0102256 A1 | 5/2005 | Bordawekar et al. | |
| 2005/0203957 A1* | 9/2005 | Wang et al. | 707/104.1 |
| 2005/0228792 A1 | 10/2005 | Chandrasekaran et al. | |
| 2005/0228818 A1 | 10/2005 | Murthy et al. | |
| 2005/0228828 A1 | 10/2005 | Chandrasekar et al. | |
| 2005/0278289 A1 | 12/2005 | Gauweiler et al. | |
| 2005/0278616 A1 | 12/2005 | Eller | |
| 2005/0289125 A1 | 12/2005 | Liu et al. | |
| 2006/0005122 A1 | 1/2006 | Lemoine | |
| 2006/0021246 A1 | 2/2006 | Schulze et al. | |
| 2006/0036631 A1 | 2/2006 | Cheslow | |
| 2006/0047646 A1 | 3/2006 | Maluf et al. | |
| 2006/0047717 A1 | 3/2006 | Pereira | |
| 2006/0059165 A1 | 3/2006 | Bosloy et al. | |
| 2006/0085737 A1 | 4/2006 | Liu | |
| 2006/0129584 A1 | 6/2006 | Hoang et al. | |
| 2006/0136761 A1 | 6/2006 | Frasier et al. | |
| 2006/0168513 A1 | 7/2006 | Coulson et al. | |
| 2006/0200439 A1 | 9/2006 | Bhatia et al. | |
| 2006/0212467 A1 | 9/2006 | Murthy et al. | |
| 2006/0235868 A1 | 10/2006 | Achilles et al. | |
| 2006/0236224 A1 | 10/2006 | Kuznetsov et al. | |
| 2006/0277289 A1 | 12/2006 | Bayliss et al. | |
| 2007/0006078 A1 | 1/2007 | Jewsbury et al. | |
| 2007/0043702 A1 | 2/2007 | Lakshminarayanan et al. | |
| 2007/0043751 A1 | 2/2007 | Chen et al. | |
| 2007/0050704 A1* | 3/2007 | Liu | 715/513 |
| 2007/0113221 A1* | 5/2007 | Liu et al. | 717/143 |
| 2007/0150432 A1 | 6/2007 | Chandrasekar et al. | |
| 2007/0208752 A1 | 9/2007 | Khaladkar et al. | |
| 2008/0028296 A1 | 1/2008 | Aharoni | |
| 2008/0082484 A1* | 4/2008 | Averbuch et al. | 707/3 |
| 2008/0091623 A1 | 4/2008 | Idicula et al. | |
| 2008/0098001 A1 | 4/2008 | Gupta et al. | |
| 2008/0098019 A1 | 4/2008 | Sthanikam et al. | |
| 2008/0098020 A1 | 4/2008 | Gupta et al. | |
| 2008/0120351 A1 | 5/2008 | Khaladkar et al. | |
| 2008/0120608 A1 | 5/2008 | Shetty et al. | |

| | | | |
|---|---|---|---|
| 2009/0112890 A1* | 4/2009 | Medi et al. | 707/100 |
| 2009/0112902 A1 | 4/2009 | Sthanikam et al. | |
| 2009/0150412 A1 | 6/2009 | Idicula et al. | |
| 2009/0216715 A1 | 8/2009 | Dexter | |

FOREIGN PATENT DOCUMENTS

| | | |
|---|---|---|
| EP | 1 241589 A2 | 9/2002 |
| JP | 61-251944 | 11/1986 |
| JP | 62-245352 | 10/1987 |
| JP | 04-004438 | 1/1992 |
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03107576 A2 | 12/2003 |
| WO | WO 2006026534 A2 | 3/2006 |

OTHER PUBLICATIONS

Xiaogang Li, Agrawal, "Efficient Evaluation of XQuery over Streaming Data", 2005, 31$^{st}$ VLDB Conference, pp. 265-276.*

IBM Research, "XAOS: An Algorithm for Streaming XPath Processing with Forward and Backward Axes" 2003, pp. 1-2.*

Bayardo et al., "An Evaluation of Binary XML Encoding Optimizations for Fast Stream Based XML Processing" *WWW2004* 10 pages.

"Binary XML Library" downloaded from the Internet Aug. 6, 2007 <http://www.smos.esa.int/BinaryXML/> 2 pages.

Chakraborty, Krishnendu, "The XML Garbage Collector", The Source for Developers, Sun Developer Network Site XP-002297849, Mar. 2002.

Chen, Ruey-Shun et al., "Developing an XML framework for metadata system", Trinity College Dublin, Proc. of the 1st Inter. Sympo. on Information and Communication, pp. 267-272, 2003.

Cheng, Josephine et al., "IBM DB2 XML Extender," IEEE, ICDE '00 Conference, San Diego, Feb. 2000, 128 pages.

"EE XML/Binary CFI File Handling Library User Manual" downloaded from the Internet <http://www.smos.esa.int/BinaryXML/SO-UM-DME-LIPP-0005-BINXML-FH-SUM-E2-RO.pdf > 49 pages, Nov. 17, 2006.

Liefke et al., "Xmill: an efficient compressor for XML data", May 2000, ACM SIGMOD Record, Proceedings of the 2000 ACM SIGMOD international conference on Management of data SIGMOD 00', vol. 29 Issue 2, Publisher: ACM Press, 12 pages.

Liu et al., "XML retrieval: Configurable indexing and ranking for XML information retrieval", Jul. 2004, Proceedings of the 27th annual international ACM SIGIR conference on Research and development in information retrieval SIGIR 04', Pulished by ACM press, 12 pages.

Lo et al., "XAS: A System for Accessing Componentized, Virtual XML Documents," IEEE, 2001, pp. 493-502.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Martin et al., "WAP Binary XML Content Format" downloaded from the Internet Aug. 6, 2007 < http://www.w3.org/TR/wbxmll > 15 pages.

Min et al., "XML Indexing and compression: XPRESS: a queriable compression for XML data", Jun. 2003, Proceedings of the 2003 ACM SIGMOD international conference on Management of data SIGMOD 03', Published by ACM Press, 8 pages.

Myllymaki, Jussi, "Effective Wed data Extraction with Standard XML Technologies," WWW10, May 1-5, 2001, pp. 689-696.

Noser, Hansrudi, et al., "Dynamic 3D Visualization of Database-Defined Tree Structures on the WWW by Using Rewriting Systems," 2000, IEEE, XP-002262516, pp. 247-254.

Oracle XML DB Developer's Guide 11gR1, Oct. 2007, http://download.oracle.com/docs/cd/B28359_01/appdev.111/b28369.pdf.

PCT/US2007/010163, Notification of Transmittal of the International Search Report and the Written Opinion of the International Searching Authority, Oct. 12, 2007, 12 pages.

Peng, Feng et al., "XPath queries on streaming data" (2003) *ACM Press*, pp. 431-442.

Schmidt et al., "Why and How to Benchmark XML Databases," SIGMOND Record, vol. 3, No. 3, Sep. 2001, pp. 27-32.

Vion-Dury, Jean-Yves, "XPath on left and right sides of rules: toward compact XML tree rewriting through node patterns" (2003) *ACM Press*, pp. 19-25.

Vorthmann, S. et al. "Beyond Schemas, Schema Adjuncts and the Outside World," Markup Languages, Online!, vol. 2, No. 3, Jun. 2000, pp. 1-8.

Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.

"Zapthink" downloaded from the Internet Aug. 6, 2007 < http://www.zapthink.com/report.html?id=ZAPFLASH-11162004 > 3 pages.

Zisman et al., "Using XML to Build Consistency Rules for Distributed Specifications," Proceedings of the Tenth International Workshop on Software Specification and Design (IWSD'00), IEEE 2000, 8 pages.

Zou et al., "XML Processing: Ctree: a compact tree for indexing XML data" Nov. 2004, Proceedings of the 6th annual international workshop on Web information and data management WIDM 04', Published by ACM Press, 10 pages.

Bruce, C.S. 2003. "CubeWerx Position Paper for Binary Interchange of XML". In Proceedings of W3C Workshop on Binary Interchange of XML Information Item Sets (The Santa Clara, The USA, Sep. 24-26, 2003) 10 pages.

Zhang, et al., "TDX: A High Performance Table-driven XML Parser", in proceedings of the 44$^{th}$ annual (ACM) Southeast Regional Conference, Mar. 2006, ACM, 6 pages.

Balmin et al., "Incremental Validation of XML Documents", ACM Trans. Database System 24, Dec. 2004, 42 pages.

Non Final Office Action of U.S. Appl. No. 12/134,196, filed Jun. 6, 2008.

Office Action for U.S. Appl. No. 11/729,943, filed Mar. 28, 2007.

Tomoharu, Asami, "Development of Database System by XML, Relaxer, and JDBC", partial English translation, XML Press, Gijutsu-Hyohron Co., Jul. 10, 2001, vol. 3, 2 pages.

Makoto, Onizuka, "XML and Database", partial English translation, XML Magazine, Shoeisha Co., Ltd., Jul. 1, 2000, vol. 10, No. 3, 1 page.

Hironobu, Koyaku, "What is brought to SQL Server 2000 by XML?", partial English translation, Enterprise Servers, IDG Japan, Dec. 1, 2000, vol. 3, No. 12, 1 page.

Chakraborty, Krishnendu, et al., "The XML Garbage Collector", XP-002297849, the Source for Developers & Sun Developer Network Site, Technical Articles & Tips, dated Mar. 2002, 5 pages.

"Efficient XML Interchange Measurements" XP-002503310, Working Draft Jul. 25, 2007 (142 pages).

Giradot et al., "Millau: an encoding format for efficient representation and exchange of XML over the Web" XP-001005949, 2000 (20 pages).

"XML Parsing" XP-002503367 Oct. 11, 2008 (4 pages).

L. Fegaras, D. Levine, S. Bose, and V. Chaluvadi, "Query Processing of Streamed XML Data," 11$^{th}$ Int'l Conf. Information and Knowledge Management, Nov. 2002, 8 pages.

Interview Summary of U.S. Appl. No. 11/950,642, filed Dec. 5, 2007.

Notice of Allowance of U.S. Appl. No. 11/743,563, filed May 5, 2007.

Office Action of U.S. Appl. No. 11/938,020, filed May 5, 2012.

Office Action of U.S. Appl. No. 12/134,196, filed Jun. 6, 2008.

\* cited by examiner

FIG. 4
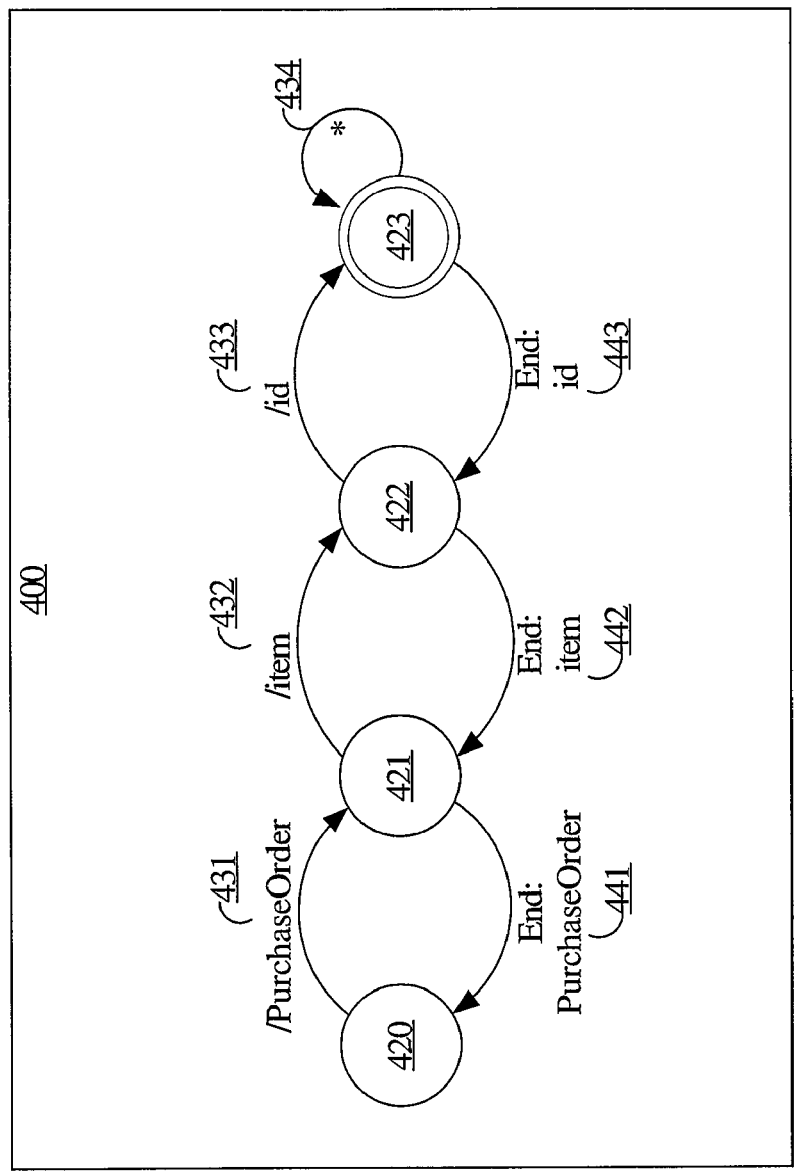
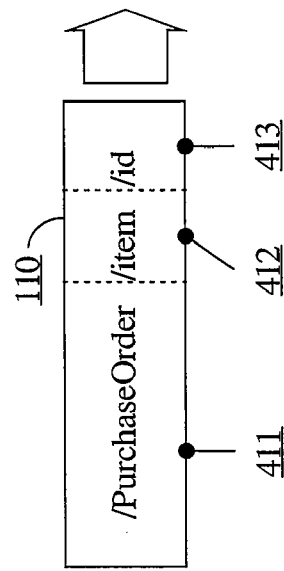

OPTIMIZED STREAMING EVALUATION OF XML QUERIES

CROSS-REFERENCE TO RELATED APPLICATIONS

This application is related to U.S. patent application Ser. No. 11/716,505, filed Mar. 8, 2007, entitled "Technique To Estimate The Cost Of Streaming Evaluation Of XPaths," by Idicula et al; and U.S. patent application Ser. No. 11/743,563, filed May 2, 2007, entitled "TECHNIQUES FOR EFFICIENT LOADING OF BINARY XML DATA," by Gupta et al., the entire contents of which are hereby incorporated by reference for all purposes as if fully set forth herein.

FIELD OF THE INVENTION

Embodiments of the invention described herein relate generally to the processing of extensible markup language (XML), and, more specifically, to techniques for optimizing streaming evaluations of XML queries.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Database systems often store within their databases XML-formatted data. This data may come from a variety of sources, though the source is often an XML document or a database object.

In XML, data items known as elements are delimited by an opening tag and a closing tag. An element may also comprise attributes, which are specified in the opening tag of the element. Text between the tags of an element may represent any sort of data value, such as a string, date, or integer.

Text within an element may alternatively represent one or more elements. Elements represented within the text of another element are known as subelements or child elements. Elements that store subelements are known as parent elements. Since subelements are themselves elements, subelements may, in turn, be parent elements of their own subelements. The resulting hierarchical structure of XML-formatted data is often discussed in terms akin to those used to discuss a family tree. For example, a subelement is said to descend from its parent element or any element from which its parent descended. A parent element is said to be an ancestor element of any subelement of itself or of one of its descendant element. Collectively, an element along with its attributes and descendants, are often referred to as a tree or a subtree.

XML Schema is a definition language that provides facilities for describing structure and constraining the contents of an XML document. A draft specification, referred to hereinafter as "XML Schema Specification", for the XML Schema definition language is described in a set of three documents published by the W3C Consortium. The first document in the set is "XML Schema Part 0: Primer Second Edition", W3C Recommendation 28 Oct. 2004, located at "http://www.w3.org/TR/xmlschema-0/", the entire contents of which are hereby incorporated by reference for all purposes as if fully set forth herein. The second document in the set is "XML Schema Part 1: Structures Second Edition", W3C Recommendation 28 Oct. 2004, located at "http://www.w3.org/TR/xmlschema-1/", the entire contents of which are hereby incorporated by reference for all purposes as if fully set forth herein. The third document in the set is "XML Schema Part 2: Datatypes Second Edition", W3C Recommendation 28 Oct. 2004, located at "http://www.w3.org/TR/xmlschema-2/", the entire contents of which are hereby incorporated by reference for all purposes as if fully set forth herein. As referred to herein, an XML schema is a defined structure for XML documents. An XML schema representation is data that describes the XML structure. An XML schema representation may include an XML document with declarations and/or a tokenized XML representation which is one for which tokens have been generated. An example of an XML schema representation includes, but is not limited to, an XML document with type definitions, element declarations, or attribute declarations.

It is important for object-relational database systems that store XML data to be able to execute queries using XML query languages. XML Query Language (XQuery) and XML Path Language (XPath) are important standards for a query language, which can be used in conjunction with SQL to express a large variety of useful queries. XPath is described in *XML Path Language (XPath)*, version 1.0 (W3C Recommendation 16 Nov. 1999), herein incorporated by reference and available at the time of writing at http://www.w3.org/TR/xpath, as well as in *XML Path Language (XPath)* 2.0 (W3C Recommendation 23 Jan. 2007), herein incorporated by reference and available at the time of writing at http://www.w3.org/TR/xpath. XQuery is described in *XQuery 1.0: An XML Query Language* (W3C Recommendation 23 Jan. 2007), herein incorporated by reference and available at the time of writing at http://www.w3.org/TR/xquery.

Some techniques for evaluating XML queries rely on normalizing an XML query to form a set of simple XPath expressions. The XPath expressions are then evaluated against a streamed XML data source using techniques that may be collectively referred to as streaming evaluations. Streaming evaluation techniques involve an XML event-streaming component and an XPath evaluation component. The event-streaming component parses an XML input stream and generates XML events for each element or attribute it finds in the XML data stream. It streams these events to the evaluation component, which evaluates the events to determine if they match a next unmatched step (i.e. constraint) in the XPath expression. One such streaming evaluation technique is discussed in "Technique To Estimate The Cost Of Streaming Evaluation Of XPaths," incorporated above.

Another streaming evaluation technique involves compiling one or more XPath expressions into a state machine, such as a non-finite automaton (NFA). The state machine functions as an evaluation component. The states and state transitions of the state machine reflect each constraint in the set of XPath expressions. Based on events received from the event-streaming component, the state machine transitions between its various states. When the state machine is in an accepting state, it generates an XPath result for the set of XPath expressions.

In some cases, an XML event-streaming component must also function as an XML decoder. This is because many database systems binary-encode XML data, as taught in, for example, "TECHNIQUES FOR EFFICIENT LOADING OF BINARY XML DATA," incorporated above. An XML event-streaming component must decode the binary-encoded XML input stream into a textual representation before it can interpret the XML data inside that stream. Only then can it recognize elements and attributes. Typically, a binary-encoding for an XML data source is based on an XML Schema. Thus, the XML decoder will utilize an XML Schema to decode the binary-encoded XML data.

It is desirable to optimize streaming evaluation techniques in order provide more efficient evaluation of XPath expressions in a database system. Increased efficiency may allow for faster streaming evaluations, less demand on computer resources during streaming evaluation, or both.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 depicts an exemplary state machine for an XPath expression, which state machine may be used to evaluate an XPath expression according to an embodiment of the invention;

DETAILED DESCRIPTION

Figure 1:
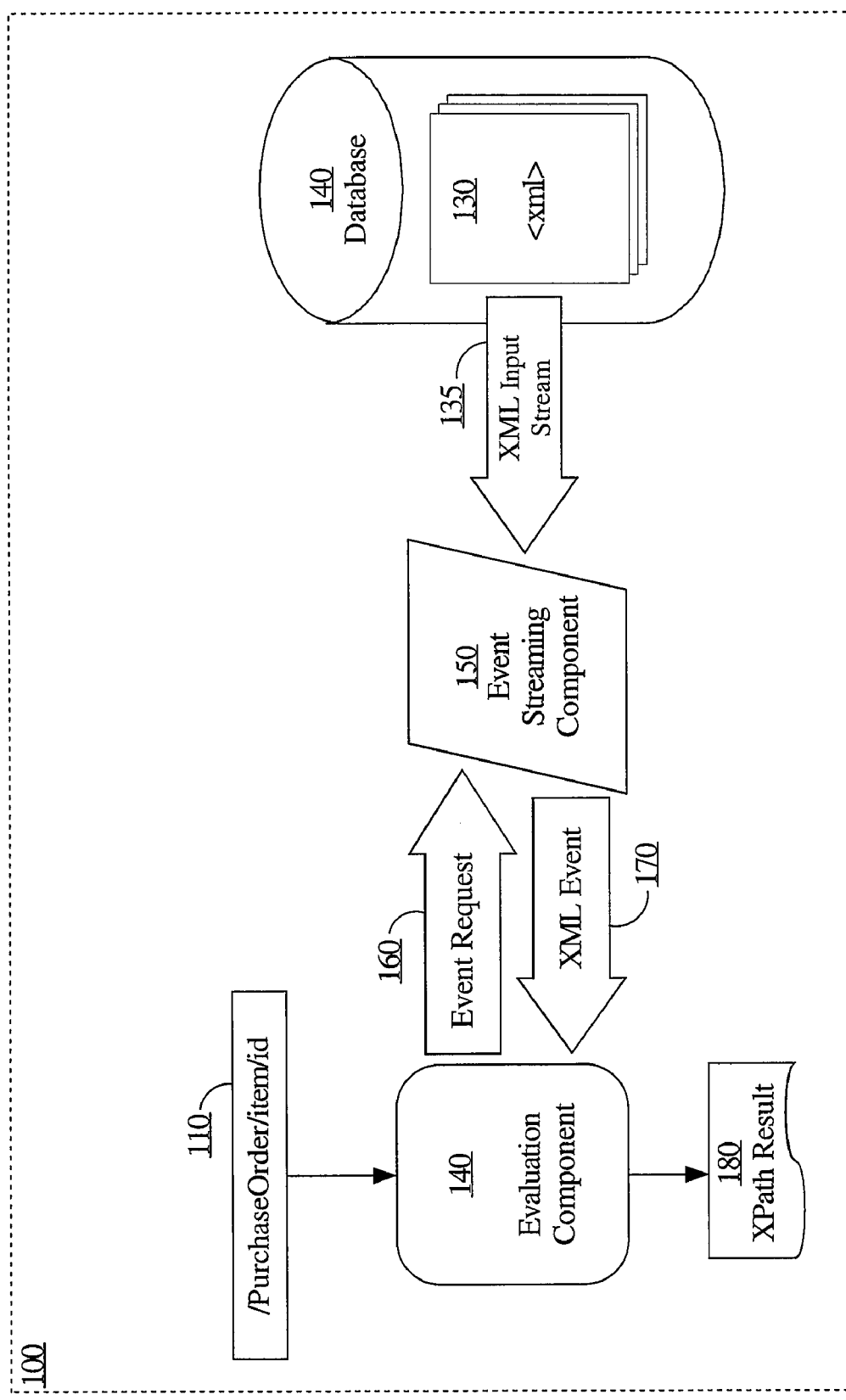
FIG. 1 is a block diagram that illustrates a database system capable of performing an unfiltered streaming evaluation of an XPath expression.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

Approaches, techniques, and mechanisms are disclosed for optimizing a streaming evaluation of an XPath expression. In unfiltered streaming evaluation techniques, an XML event-streaming component may generate an XML event for each and every element in an XML data source. It then sends each and every event to an XPath evaluation component. The evaluation component may be, for example, a state machine. The evaluation component must evaluate each event it receives. Both the transmission and evaluation of events consume significant computing resources.

According to an embodiment of the invention, a filtered streaming evaluation of an XPath expression may consume less computing resources if the event-streaming component provides an interface whereby the evaluation component may send certain criteria to the event-streaming component when requesting an XML event. The criteria may be based on a next unmatched step in the XPath expression. In response to the request for an XML event, the event-streaming component may only return events that match the criteria, thus avoiding unnecessary transmission and evaluation of XML events. The evaluation component may match the XML event to said next unmatched step, and then repeat the evaluation with respect to a new next unmatched step.

According to an embodiment of the invention, a database system may compile one or more XPath expressions into a state machine, which state machine serves as an evaluation component. The XPath expressions may be, for example, normalized from an XQuery. The state machine may represent the steps of an XPath expression as states and state transitions. During evaluation of the XPath expression, the state machine may keep track of a current state or set of states. The database system may transition between states in the state machine in response to XML events that the state machine requests from an XML event-streaming component. For certain states, the database system may determine conditions or criteria based on state transitions away from the state. These conditions may be determined during execution or compilation of the state machine. When the state machine is "in" one or more of these certain states, the state machine may specifically request that the XML event-streaming component only respond with an XML event that matches the conditions or criteria for the one or more certain states. The XML event-streaming component may only send an XML event that matches the conditions or criteria. In response to the XML event, the database system transitions to an appropriate state.

According to an embodiment, a streaming evaluation technique may be further optimized by utilizing criteria sent from the evaluation component to skip processing of certain segments of XML data in the event-streaming component. The event-streaming component may have access to an XML schema for incoming XML data. Based on this schema, the event-streaming component may be able to determine that an event matching the criteria will not occur for a certain segment of the XML data. It may thus safely skip that segment. Such an embodiment may save resources by not processing potentially large amounts of XML data. Such an embodiment also may save resources that would otherwise be spent decoding the XML data when the XML input stream is binary-encoded.

2.0. Structural Overview 2.1. System for Streaming Evaluation of an XPath Expression FIG. 1 is a block diagram that illustrates a database system 100 capable of performing an unfiltered streaming evaluation of an XPath expression.

Database system 100 is evaluating XPath expression 110. XPath expression 110 may be any type of XPath expression. XPath expression 110 may be designed to produce one or more XML result sets, comprising elements, attributes, values, or any combination thereof, from a larger collection of XML data. XPath expression 110 may comprise several constraints, each of which indicate a characteristic of either an element, attribute, or value to be returned in the result set, or of an ancestor or descendant of that element, attribute, or value. These constraints may be referred to as "steps," in that one constraint must typically be met before the next constraint can be evaluated. For example, the steps depicted in XPath expression 110 are, in order: PurchaseOrder (an element), item (a child element of any qualifying PurchaseOrder element), and id (a child element of any qualifying item element). XPath expression 110 may include other types of steps, such as predicates.

Database system 100 may be evaluating XPath expression 110 for one of any number of reasons. For example, a client may have submitted XPath expression 110 as part of an XQuery. As another example, a client may have submitted a more complex XQuery statement that database system 100 normalized (i.e. simplified) into XPath expression 110. As another example, database system 100 may need to evaluate XPath expression 110 to complete another operation internal to database system 100.

Database system 100 comprises a database 120 that stores XML data. Database system 100 will evaluate XPath expression 110 against data in database 120. More specifically, database system 100 will evaluate XPath expression against XML data collection 130, which is a subset of the XML data stored in database 120. XML data collection 130 may comprise all XML data sources in database 120. Alternatively, XML data collection 130 may comprise a subset of XML data sources in database 120. For example, the data collection 130 may comprise those data sources that are implicated either explicitly or contextually by an XQuery statement from which XPath expression 110 originated. Data collection 130 also may span multiple databases, or may reside in files on disk instead of in database 120.

Database system 100 comprises an evaluation component 140. Evaluation component 140 may be, for example, a compiled representation of XPath expression 110, such as the state machine discussed in section 4.1.

Database system 100 also comprises an XML event-streaming component 150. Event streaming component 150 may be, for example, an XML Parser or XML Decoder provided by database system 100. Database system 100 feeds data from data collection 130 as input to event-streaming component 150. For example, database system 100 may establish an XML input stream 135, whereby characters or bytes from each data source in data collection 130 are fed one-by-one to event-streaming component 150. Alternatively, database system 100 may feed entire XML documents or objects to event-streaming component 150.

Database system 100 may utilize evaluation component 140 to evaluate XPath expression 110. Evaluation component 140 may evaluate the steps of XPath expression 110 step-by-step. For each step, evaluation component 140 will look for one or more XML events that match the step. Thus, it requests, one-by-one, events from event-streaming component 150. When it is ready for a new event, evaluation component 140 sends an event request 160 to event-streaming component 150.

When event-streaming component 150 receives event request 160, event-streaming component 150 parses the XML data received over XML input stream 135 linearly. When event-streaming component 150 recognizes, for instance, an element, attribute, or value in the XML data, it generates an XML event 170 for the recognized element, attribute, or value. It sends the XML event 170 to the evaluation component 140.

According to an embodiment, XML event 170 is a standard Simple API for XML (XML SAX) event. Each element in the inputted XML data may, for instance, trigger a beginning and an ending event, corresponding to the opening tag and the closing tag of that element, respectively. Alternatively, event-streaming component 150 may generate any other type of event, so long as evaluation component 140 is capable of interpreting the generated event.

When evaluation component 140 receives XML event 170, it evaluates XML event 170 to determine if XML event 170 (possibly in conjunction with previously received events) matches a next step in XPath expression 110. Evaluation component 140 may employ one of many techniques to determine if an event or series of events matches a step in XPath expression 110. One such technique is described in section 4.1.

If XML event 170 matches a step in XPath expression 110, evaluation component 140 "remembers" that the step has been matched, and begins looking for an XML event that matches the next unmatched step. If all steps in XPath expression 110 have been matched, evaluation component 140 may generate an XPath result 180. Over the course of evaluation, evaluation component 140 may generate many XPath results 180.

Alternatively, XML event 170 may indicate the closing of a previously received XML event. For example, event-streaming component 150 may have sent an XML event 170 indicating the closing of the subtree that matched the deepest matched step in XPath expression 110. Upon receiving such an event, evaluation component 140 may mark the deepest matched step as unmatched and return to searching for a match to this previous step.

After evaluation component 140 has completed evaluating an XML event 170, evaluation component 140 may send a new event request 160, and thereby continue processing the XML data from data collection 130.

According to an embodiment, the data in data collection 130 may be binary-encoded XML. In this embodiment, event-streaming component 150 may also function as an XML decoder, as it may need to decode the binary-encoded XML before it can properly interpret it and generate XML events.

2.2. Optimized System for Filtered Streaming Evaluation of an XPath Expression

Figure 2:
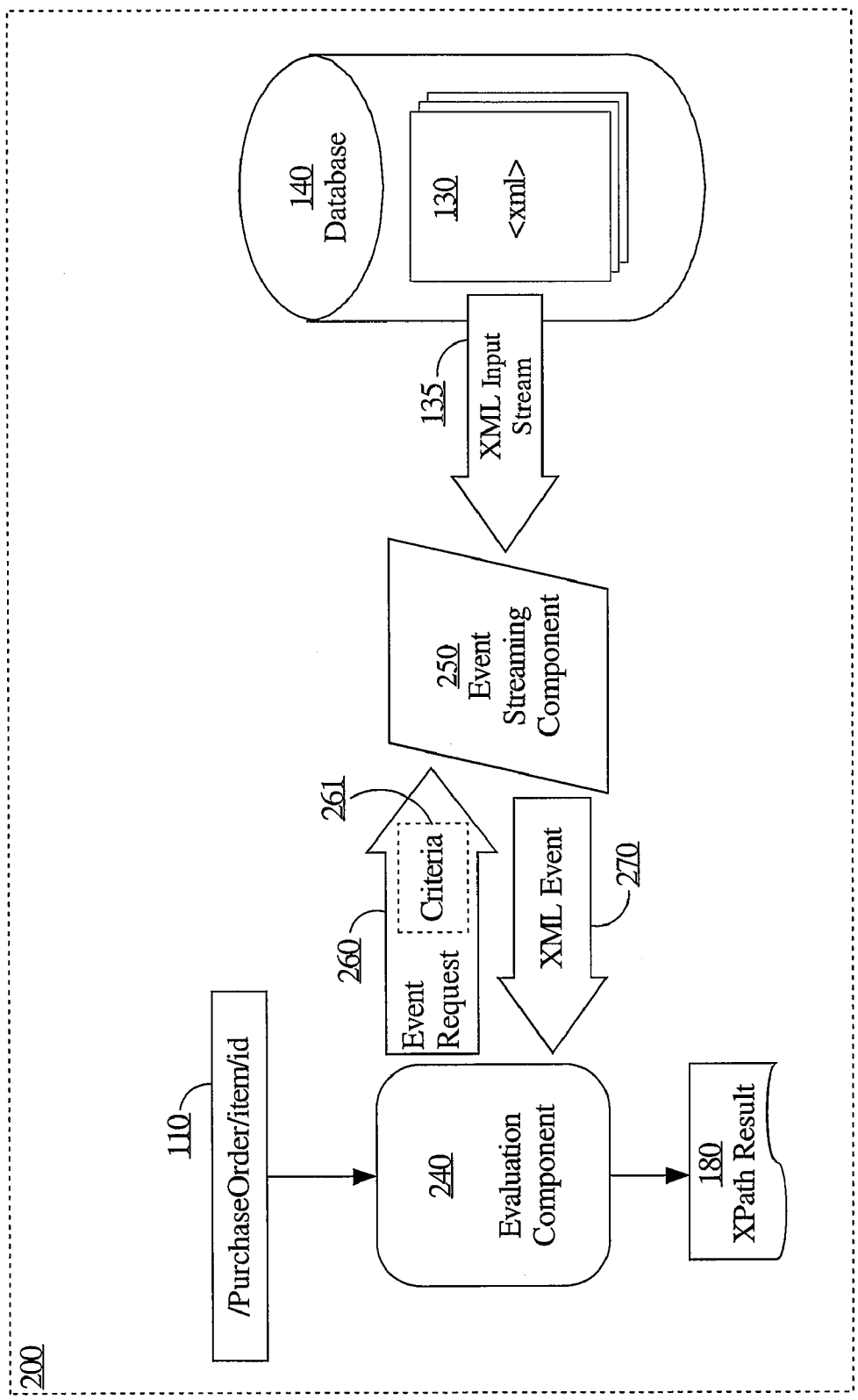
FIG. 2 is a block diagram that illustrates a database system capable of performing a filtered streaming evaluation of an XPath expression in accordance with an embodiment of the invention.

FIG. 2 is a block diagram that illustrates a database system 200 capable of performing a filtered streaming evaluation of an XPath expression in accordance with an embodiment of the invention. Database system 200 comprises many of the same components from database system 100. However, several components have been replaced with components that allow for a more optimal streaming evaluation of XPath expression 110.

First, evaluation component 140 has been replaced with optimal evaluation component 240. Optimal evaluation component 240 is like evaluation component 140 in many respects except that evaluation component 240 is also configured to send an event request 260 that includes criteria 261. Criteria 261 comprises information indicating characteristics of an XML event that will match a next step in XPath expression 110 to be evaluated by evaluation component 140. For example, criteria 261 may comprise the names of elements, attributes, or values that will match the next step in XPath expression 110. However, evaluation component 240 need not necessarily always send criteria 261.

Second, event-streaming component 150 has been replaced with optimal event-streaming component 250. Event-streaming component 250 is like event-streaming component 150 in many respects except that event-streaming component 250 has also been configured to provide an interface for receiving an event request 260 that includes criteria 261. In response to receiving event request 260, event-streaming component 250 has been configured to send an XML event 270 that matches criteria 261.

For example, event-streaming component 250 may parse through data collection 130, generating XML events for each element, attribute, or value. If the generated event does not match criteria 261, it is discarded. Otherwise, the event is sent to evaluation component 240 as XML event 270. Alternatively, event-streaming component 250 may utilize criteria 261 to optimize its parsing of XML data, so that it does not need to generate XML events for certain portions of the inputted XML data. Section 4.3 describes one example of an event-streaming component that behaves in this manner.

According to an embodiment, event-streaming component 250 only searches for a match under the subtree for the current element in XML input stream 135—that is to say, the subtree of the currently open element in XML input stream 135. If no match is found under the current subtree, event-streaming component 250 may be configured to respond with an XML event 270 indicating that no match was found. For example, event-streaming component 250 may be configured to send an XML event 270 indicating the closing of the subtree in the XML data. Upon receiving such an event, evaluation component 240 may return to evaluating a previous step.

Alternatively, event-streaming component 250 may search for matches under sibling elements to the current element, if, for example, criteria 261 describes a sibling structural relationship.

3.0. Functional Overview

Figure 3:
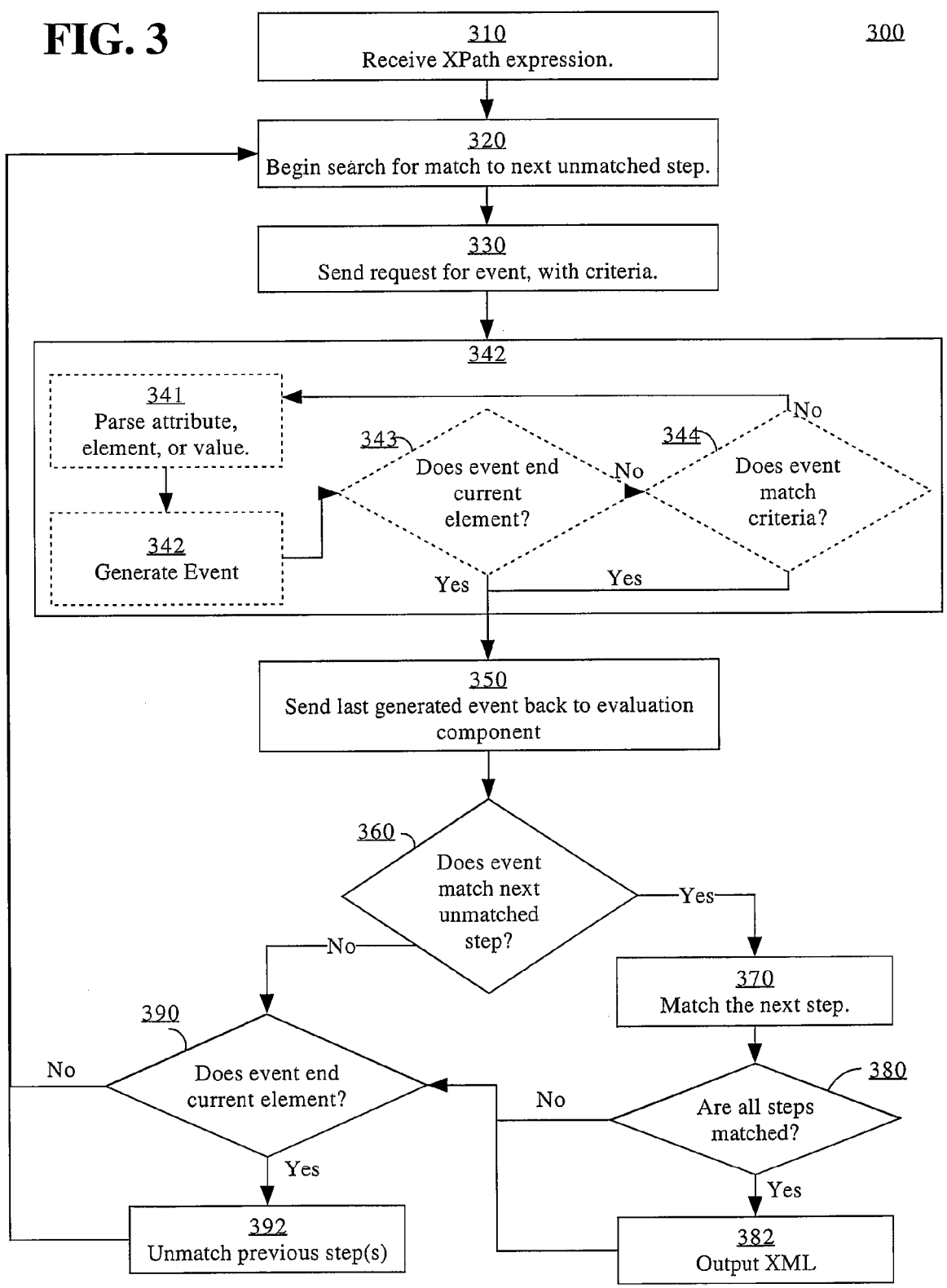
FIG. 3 depicts a flow diagram that illustrates an optimized method for streaming evaluation according to an embodiment of the invention.

FIG. 3 depicts a flow diagram 300 that illustrates an optimized method for streaming evaluation according to an embodiment of the invention.

In step 310, a database system, such as database system 200, receives an XPath expression, such as XPath expression 110, to be evaluated against one or more XML data sources, such as XML data collection 130. The XPath expression may have been received in a variety of manners. For example, it may have been received directly from a client. As another example, the database system may have computed the XPath expression by normalizing an XQuery received from a client. As another example, another operation occurring in the database system may have triggered evaluation of the XPath expression.

In step 320, an evaluation component, such as evaluation component 240, begins searching for a match to a step in the XPath expression. The database system may create the evaluation component in response to step 310. For example, the evaluation component may be a compiled representation of the XPath expression, such as the state machine discussed in section 4.1. Alternatively, the evaluation component may be a pre-defined component of the database system.

The step of the XPath expression processed in step 320 will be the next logical step in the XPath expression for which no match has been found. Initially, this step may be the first step of XPath expression. For example, for XPath expression 110, this step would initially be PurchaseOrder.

In step 330, the evaluation component sends a request to an XML event-streaming component, such as event-streaming component 250. This request is, like event request 260, a request for an XML event. The request may include criteria, such as criteria 261, indicating characteristics of an XML event that will match the next unmatched step of the XPath expression. For example, if the evaluation component is searching for a match to the first step in XPath expression 110, it may send criteria information that includes the search term PurchaseOrder.

The criteria sent in step 330 may also include structural information. For example, the criteria information may include information indicating that the returned PurchaseOrder element should be a child or sibling of the last element parsed by the event-streaming component. As another example, the criteria information could indicate structure without a name, such as a request for the nth child of the root element, or the nth sibling of the current element. The criteria information may also include constraints on values or attribute values. For example, the criteria information may indicate that the event-streaming component should only return a certain attribute with a date greater than 12/02/2006.

In step 340, the event-streaming component generates an XML event that either matches the criteria or indicates that no matching event could be generated under the subtree for the element currently being parsed. The event-streaming component performs step 340 by linearly parsing XML data from an XML data source in search of an element, attribute, or value that will generate an event that matches the criteria. For example, if the criteria information had indicated the search term PurchaseOrder, the event-streaming component would look for a beginning tag for an element named PurchaseOrder. The event-streaming component only searches for a match under the current subtree—that is to say, the subtree of the currently open element in the XML input stream. If the event-streaming component fails to find a match in the current subtree, it returns a closing event for the current subtree.

According to an embodiment, the request sent in step 330 may not necessarily have included criteria information. In this case, the event-streaming component may operate as if the criteria information had indicated that any XML event would match.

Substeps 341-344 illustrate a method for accomplishing step 340 according to an embodiment of the invention. In step 341, the event-streaming component recognizes an element, attribute, or value in the XML data. In step 342, the event-streaming component generates an event based upon the recognized element, attribute, or value.

In step 343, the event-streaming component determines if the event closes the current subtree (i.e. if it is a closing tag for the current element, thus indicating that no match was found in the current subtree). If so, flow proceeds to step 350.

Otherwise, in step 344, the event-streaming component compares the event to the criteria. If the event matches the criteria, flow proceeds to step 350. Else, flow returns to step 341.

Step 340 may be performed in a variety of other ways. For example, the criteria-matching logic may occur before generating events, so that the event-streaming component only generates XML events that match the criteria or indicate that there was no match. As another example, the event-streaming component may utilize the criteria along with XML schema information to skip parsing of certain segments of the XML data, as discussed in section 4.3.

In step 350, the event-streaming component sends the last generated XML event to the evaluation component.

In step 360, the evaluation component determines whether the received XML event matches the next unmatched step in the XPath expression. If it does not, flow proceeds to step 390. If it does, flow proceeds to step 370. In step 370, the evaluation component updates itself to indicate that said next unmatched step is matched.

In step 380, the evaluation component determines if all the steps in the XPath expression have now been matched. If not, the evaluation component proceeds to step 390. If all steps have been matched, flow proceeds to step 382. In step 382, the evaluation component is said to be in an "accepting state." Thus, in step 382, the evaluation component outputs the received event as an XPath result.

In step 390, the evaluation component determines whether the received event indicates the ending of the element upon which matching the matching of the most recently matched step was precedented. For example, the evaluation component might make such a determination is the event-streaming component failed to find a match under the current subtree. If the answer is no, flow returns to step 320. If the answer is yes, flow proceeds to step 392.

In step 392, the evaluation component updates itself to indicate that one or more previous steps are not matched, thereby returning to evaluating of a previous step of the XPath expression. For example, if the evaluation previously matched a first step of the XPath expression, and was searching for a match to a second step, it would unmatch the first step and return to searching for a match to the first step. Depending on the XML event, the evaluation component may regress multiple steps. For example, two previously matched steps may have involved a constraint on an element and an attribute of the element. The closing of the element would represent that no match could be found not only for the step based on that element, but also for the step based on the attribute. From step 392, flow then returns to step 320, which is then evaluated with respect to the previous step of the XPath expression.

Note that if, upon returning to step 320, there are no unmatched steps, the evaluation component instead make a conventional event request in step 330 for any XML event. Or it may send a request with criteria information indicating that any XML event may be returned.

According to an embodiment, many of the steps of flow 300 are interchangeable. For example, the ordering of steps 360-392 or steps 343-344 may vary. Furthermore, according to an embodiment, the steps above may involve other interceding steps. For example, the event-streaming component may also be configured to send an XML event indicating that no XML data remains for parsing. In response, the evaluation component may terminate evaluation, and notify the database system that the XPath result is complete.

According to an embodiment, more complex criteria may be sent in step 330 to evaluate multiple XPath expressions at the same time. The criteria may reflect, for example, a plurality of next steps in the multiple XPath expressions. In response to receiving the XML event, the evaluation component may further require determining one or more of the plurality of XPath steps that match the XML event. Furthermore, the evaluation component may be in an accepting state in regards to one of the XPath expressions at the same time as it is in a non-accepting state for another XPath expression. Such an embodiment is described more fully in section 4.4.

4.0. Implementation Examples 4.1. State Machine for an XPath Expression

A database system may utilize a compiled representation of an XPath expression as an evaluation component for the XPath expression. A compiled representation facilitates more efficient processing of an XPath expression, especially if the XPath expression is to be evaluated repeatedly against many XML data sources. A database system may compile a representation of an XPath expression in a variety of forms.

According to an embodiment, a database system may compile a state machine to represent an XPath expression. Any type of state machine may be used. For example, the state machine may be a finite automata (FA) or a non-deterministic finite automata (NFA).

FIG. 4 depicts an exemplary state machine 400 for XPath expression 110. State machine 400 is one of many ways XPath expression 110 may be represented in a state machine.

As previously discussed, XPath expression 110 comprises 3 steps (i.e. constraints) that define characteristics of a matching element or value in the XML data. Step 413 indicates that a match to XPath expression 110 should consist of an XML child element (or node) named id. Step 412 indicates that this matching id element must be a child of a parent element named item. Step 412 indicates that the parent item element must be a child of a parent element named item.

State machine 400 represents the steps of XPath expression 110 with a series of states and state transitions. State machine 400 comprises states 420, 421, 422, and 423. At any given moment during the evaluation of XML data, state machine 400 may be said to be in one of these 4 states, depending on what events state machine 400 has received. Like steps 411-413, the states are sequentially related. State 420 is an initial state. State 423 is an accepting state, indicated as such in FIG. 4 by double circles. States 421 and 422 are intermediate states.

State machine 400 also comprises state transitions 431, 432, and 433, each of which corresponds to a constraint in XPath expression 110. State transitions 431, 432, and 433 define conditions under which state machine 400 may transition from one state to another. For example, state machine 400 may transition from state 420 to 421 under state transition 431, which requires a PurchaseOrder element.

State machine 400 also comprises gamma transitions 441, 442, and 443. These "backwards" transitions represent transitions from later states to earlier states. Such transitions may occur, for example, when the state machine receives an event that closes an element upon which entry to the current state was precedented.

State machine 400 also comprises state transition 434, which simply indicates that once state machine is in accepting state 423, it should remain in state 423 until it receives an event that results in gamma transition 443 (i.e. the closing of the item subtree). It will send, as an XPath result, XML for any events that it receives while in state 423. Alternatively, state machine 400 need not explicitly define state transition 434, but merely implement code that behaves similarly upon reaching an accepting state.

State machine 400 may be used to evaluate any XML data. For example, state machine 400 may be used to evaluate the following simple XML data segment:

```
<PurchaseOrder>
    <canceled />
</PurchaseOrder>
<ServiceCall id="6">
    <description>Tech Support</description>
</ServiceCall>
<PurchaseOrder>
    <item>
        <id>JGF1098</id>
    </item>
</PurchaseOrder>
```

Figure 5:
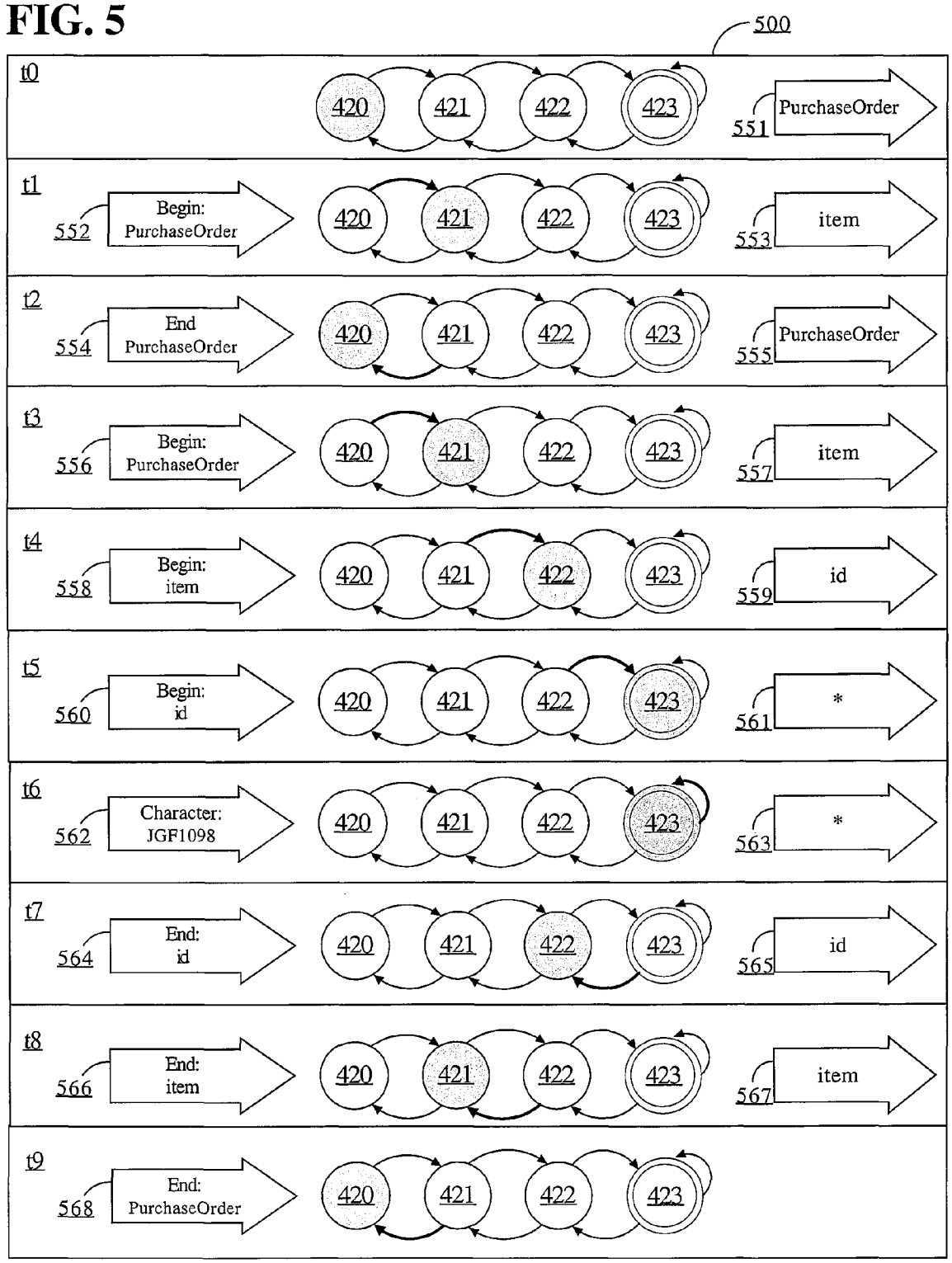
FIG. 5 is a time flow illustrating the use of an exemplary state machine to evaluate an XPath expression against a sample XML data segment, in accordance with an embodiment of the invention.

FIG. 5, discussed below, illustrate some of the effects of evaluating this XML data segment with state machine 400 when the filtered streaming evaluation techniques described above are applied to state machine 400.

Evaluating a Sample XML Data Stream with a State Machine Using Optimized Streaming Techniques FIG. 5 is a time flow 500 illustrating the use of state machine 400 to evaluate XPath expression 110 against the XML data segment listed above, in accordance with an embodiment of the disclosed filtered streaming evaluation techniques. FIG. 5 depicts state machine 400 at times t0-t9. For simplicity, state transitions are not labeled for each time—however, the state transitions are the same as depicted in FIG. 4. For each time, the current state is indicated by gray shading. A followed transition is indicated by a bolded arrow. FIG. 5 is exemplary, only, as there a large number of variations on the embodied streaming technique that may result in slightly different evaluation time flows.

At time t0, state machine 400 begins evaluation. To evaluate the XML data segment, state machine 400 will first initialize itself. Initially, state machine 400 is in state 420. State machine 400 sends request 551 to an XML event-streaming component, such as XML event-streaming component 250, to generate an event based on this data. As discussed in step 330, the request may contain criteria information. This criteria information may be based, for example, on the state transitions that lead forward from the current state. Thus, request 551 includes criteria information indicating that the sought-after XML event should contain an element named PurchaseOrder.

At time t1, in response to receiving request 551, the event-streaming component will parse through the XML data segment, looking for the first element named PurchaseOrder. It immediately finds such an element. It thus generates and sends event 552 to state machine 400. Event 552 indicates the beginning of a PurchaseOrder element. Upon receiving event 552, state machine 400 compares it to all transitions that lead from state 420. It finds that event 552 matches transition 431. State machine 400 thus follows transition 431 and enters state 421. State machine 400 then sends request 553 to the event-streaming component. Request 553 includes criteria information indicating that the sought-after XML event should contain an element named item.

At time t2, in response to receiving request 553, the event-streaming component will parse through the XML data segment, looking for an element named item. It does not find such an element before it reaches the end of the currently parsed element (i.e. PurchaseOrder). Consequently, the event-streaming component will generate and send event 554 to state machine 400. Event 554 indicates the end of the element named PurchaseOrder. Upon receiving event 554, state machine 400 compares it to all transitions that lead from state 421. It finds that event 554 matches gamma transition 441. State machine 400 thus follows transition 441 and enters state 420. State machine 400 then sends request 555 to the event-streaming component. Request 555 includes criteria information indicating that the sought-after XML event should contain an element named PurchaseOrder.

Note that, in contrast with unfiltered streaming evaluation techniques, no event is sent to or evaluated by state machine 400 for the non-matching subelement of PurchaseOrder, thus reducing demands on computing resources.

At time t3, in response to receiving request 555, the event-streaming component will parse through the XML data segment, looking for the next element named PurchaseOrder. After skipping through the ServiceCall element, it finds the next PurchaseOrder element. It thus generates and sends event 556 to state machine 400. Event 556 indicates the beginning of a PurchaseOrder element. Upon receiving event 556, state machine 400 compares it to all transitions that lead from state 420. It finds that event 556 matches transition 431. State machine 400 thus follows transition 431 and enters state 421. State machine 400 then sends request 557 to the event-streaming component. Request 557 includes criteria information indicating that the sought-after XML event should contain an element named item.

Note that, in contrast with unfiltered streaming evaluation techniques, no event is sent to or evaluated by state machine 400 for the non-matching ServiceCall element or any of its subelements, thus reducing demands on computing resources. Also note that, according to an embodiment, if the XML schema for the sample XML data segment defined ServiceCall in such a manner that the event-streaming component could determine that ServiceCall could not contain a PurchaseOrder element, the event-streaming component might altogether skip parsing the data inside of ServiceCall.

At time t4, in response to receiving request 557, the event-streaming component will parse through the XML data segment, looking for an element named item. It immediately finds such an element. It thus generates and sends event 558 to state machine 400. Event 558 indicates the beginning of an element named item. Upon receiving event 558, state machine 400 compares it to all transitions that lead from state 421. It finds that event 558 matches transition 432. State machine 400 thus follows transition 432 and enters state 422. State machine 400 then sends request 559 to the event-streaming component. Request 559 includes criteria information indicating that the sought-after XML event should contain an element named id.

At time t5, in response to receiving request 559, the event-streaming component will parse through the XML data segment, looking for an element named id. It immediately finds such an element. It thus generates and sends event 560 to state machine 400. Event 560 indicates the beginning of an element named id. Upon receiving event 570, state machine 400 compares it to all transitions that lead from state 422. It finds that event 560 matches transition 433. State machine 400 thus follows transition 433 and enters state 423. State 423 is an accepting state. Because state machine 400 is in an accepting state, it has found a match for XPath expression 110. It thus outputs <id> to XPath result 180. State machine 400 then sends request 561 to the event-streaming component. Request 561 includes criteria information indicating that the event-streaming component may send XML events for any data under the current element. Alternatively, request 561 may omit criteria information, since any event would be acceptable.

At time t6, in response to receiving request 561, the event-streaming component will generate and send event 562 to state machine 400. Event 562 indicates the value JGF1098. Upon receiving event 562, state machine 400 compares it to all transitions that lead from state 423. It finds that event 562 matches transition 434. State machine 400 thus follows transition 434 and re-enters state 423. Since state machine is still in an accepting state, it outputs JGF1098 to XPath result 180. State machine 400 then sends request 563 to the event-streaming component. Request 563 includes criteria information indicating that the event-streaming component may send XML events for any data under the current element.

At time t7, in response to receiving request 563, the event-streaming component will generate and send event 564 to state machine 400. Event 564 indicates the end of the element named id. Upon receiving event 564, state machine 400 compares it to all transitions that lead from state 423. It finds that event 564 matches gamma transition 443. State machine 400 thus follows transition 443 and enters state 422. State machine 400 then sends request 565 to the event-streaming component. Request 565 includes criteria information indicating that the sought-after XML event should contain an element named id.

At time t8, in response to receiving request 565, the event-streaming component will generate and send event 566 to state machine 400. Event 566 indicates the end of the element named item. Upon receiving event 566, state machine 400 compares it to all transitions that lead from state 422. It finds that event 566 matches gamma transition 442. State machine 400 thus follows transition 442 and enters state 421. State machine 400 then sends request 567 to the event-streaming component. Request 567 includes criteria information indicating that the sought-after XML event should contain an element named item.

At time t9, in response to receiving request 567, the event-streaming component will parse through the XML data segment, looking for an element named item. It does not find such an element before it reaches the end of the currently parsed element (i.e. PurchaseOrder). Consequently, the event-streaming component will generate and send event 568 to state machine 400. Event 568 indicates the end of the element named PurchaseOrder. Upon receiving event 568, state machine 400 compares it to all transitions that lead from state 421. It finds that event 568 matches gamma transition 441. State machine 400 thus follows transition 441 and enters state 420.

As discussed above, a state machine may use forward state transitions to calculate criteria information in its event requests. According to an embodiment, the criteria information may also be based on gamma transitions. Thus, the event-streaming component may easily determine, without consulting its own state information, if a given event effectively closes the current subtree in the XML data. According to an embodiment, a state machine may also be compiled so that a single gamma transitions may regress multiple states, rather than requiring the state machine to determine after each gamma transition if another gamma transition is required.

According to an embodiment, a state machine may also specifically request an event based on attribute or value that meets a certain test (e.g. equals a certain other value, is greater than another value, and so on). For example, it could request an attribute named year with a value greater than 2006. Alternatively, an event request could include criteria indicating only that an attribute of a certain name is required. The state machine, then, may be responsible for determining if the value of the returned attribute matched the appropriate transition.

Though state machine 400 and XPath expression 110 are relatively simple, the filtered streaming evaluation techniques described herein are equally applicable to any state machine and any XPath expression, including state machines for expressions with more complex steps such as predicates. According to an embodiment, XPath expressions with predicates may first be normalized into multiple XPath expressions in order to simplify the state machine. Alternatively, predicates may be represented with more complex state machines.

4.2. Pre-Compiling Criteria for a State

According to an embodiment, a state machine may determine the criteria included in each above event request at execution time, based on the current state. Alternatively, criteria may be determined for each state in the state machine when the state machine is compiled, thus avoiding the need to calculate the requisite criteria multiple times during execution of the state machine.

According to an embodiment where the state machine may at times be in multiple states (as discussed below), combined criteria may be computed for a set of states at execution time based on the pre-compiled criteria. Alternatively, combined criteria for each possible set of states is pre-compiled at compilation time.

4.3. Utilizing Criteria and XML Schema Information to Optimize an XML Event-Streaming Component According to an embodiment, an event-streaming component may utilize criteria information sent in an event request to optimize its parsing of XML data. If the XML data source is defined by an XML schema, enough information about the structure of the XML data may be known that the event-streaming component may skip over large amounts of XML data without having to generate XML events or determine if the XML data matches the criteria.

For example, an event-streaming component may receive a request for an event based on an element named A. Based on schema definitions, it may know that an element named A may only occur as the fifth child element of the current subtree. It may safely skip the first four child elements, neither parsing the XML data for those elements nor generating events for those elements (and their subelements).

As another example, an event-streaming component may receive a request for the last subelement of the current element. It may know, from the schema, the exact size in memory of each subelement. It may thus skip over exactly that size of data.

4.4. Concurrently Evaluating Multiple XPath Expressions

According to an embodiment, a database system may evaluate multiple XPath expressions with the same evaluation component. It may, for example, normalize an XQuery into one or more simpler XPath expressions, both of which should nonetheless be run against the same XML data. As another example, it may normalize an XPath with a complex predicate into one or more simpler XPath expressions.

Multiple XPath expressions may be evaluated using the techniques disclosed in FIG. 3 with very little modification. One modification may be, in step 320, to configure the evaluation component to search for matches to multiple steps at the same time. In step 330, the evaluation component may send more complex criteria, indicating characteristics of an XML event that will satisfy any step for which the evaluation component is currently seeking a match. Steps 360 through 392 may be applied with respect to each different step for which the evaluation component is seeking a match. Thus, for example, the evaluation component may be in an accepting state in regards to one of the XPath expressions at the same time as it is in a non-accepting state for another XPath expression.

For example, a database system may compile a non-deterministic state machine representing multiple XPath expressions for use as an evaluation component.

Using Non-Deterministic State Machines

Figure 6:
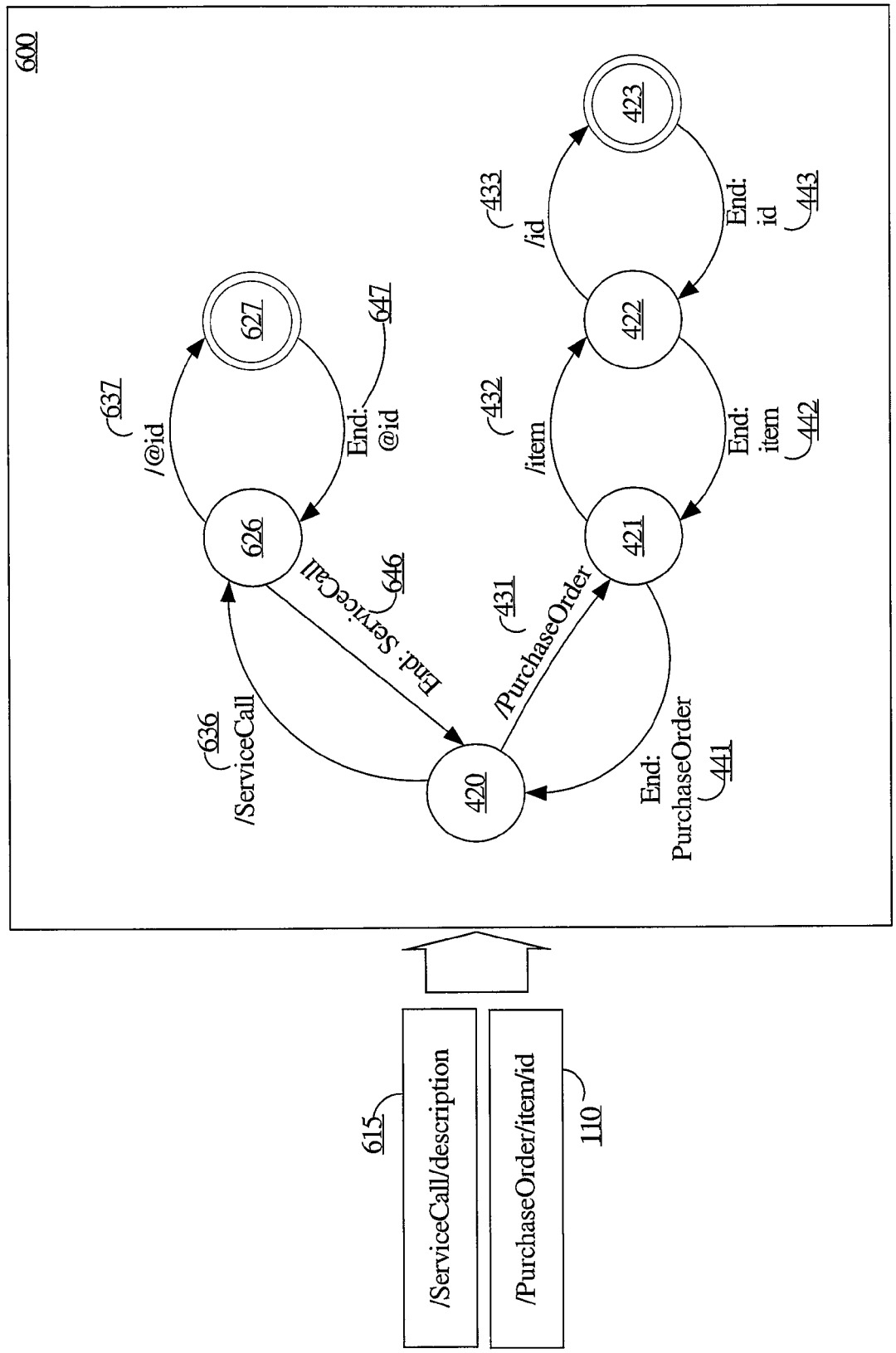
FIG. 6 is a block diagram illustrating a state machine compiled from multiple XPath expressions, by which a database system may evaluate multiple XPath expressions concurrently according to an embodiment of the invention.

FIG. 6 is a block diagram illustrating a state machine 600 compiled from multiple XPath expressions, by which a database system may evaluate multiple XPath expressions concurrently according to an embodiment of the invention.

Database system comprises state machine 600. State machine 600 is a compiled representation of XPath expression 110 and XPath expression 615. XPath expression 110 and XPath expression 615 may have been normalized, for example, from an FLWOR ("For-Let-Where-Order-Return") expression in an XQuery.

State machine 600 comprises the same components as state machine 400. Additionally, it comprises states 626 and 627, state transitions 636 and 637, and gamma transitions 646 and 647. Like state 623, step 627 is an accepting state. Meanwhile, state transitions 636 and 637 correspond to XPath steps 616 and 617, which require a ServiceCall element and a description element, respectively. State transition 636 transitions from state 620 to state 626. State transition 637 transitions from state 626 to 627. Gamma transitions 646 and 647 operate in reverse from state transitions 636 and 637, respectively.

Evaluation an XML data source with state machine 600 would proceed just as with state machine 400 in FIG. 5, except that state machine 600 may, at certain times, be said to be in multiple states. For example, at time t2, state machine 600 may be both at step 422 and step 420, since it may still theoretically find a match for the ServiceCall element under the PurchaseOrder element. Thus, it would send a request to the event-streaming engine with criteria based on both state transition 433 and state transition 626. In other words, state machine 600 would, at that point, accept an XML event for either an item element or a ServiceCall element.

This same technique may be used for any non-deterministic state machine compiled from any number of XPath expressions, where the state machine may be said to be in a set of states as opposed to a single state.

According to an embodiment, certain state machines may require the traversal of one or more specific states—such as another accepting state or a branch for a predicate—before generating output in an accepting state. Such may be the case for more complex state machines, or state machines that represent multiple XPath expressions.

5.0. Implementation Mechanism—Hardware Overview

Figure 7:
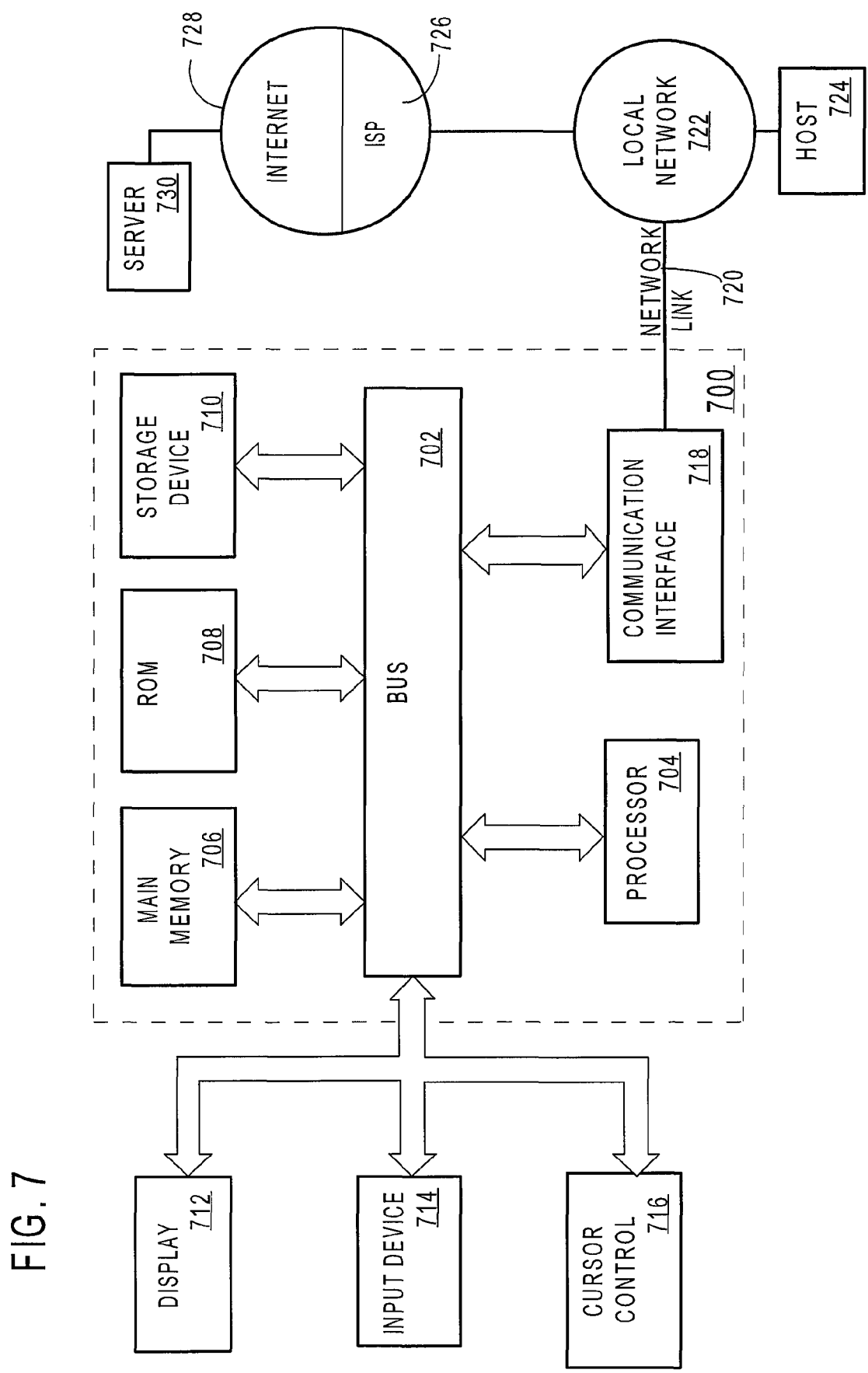
FIG. 7 is block diagram of a computer system upon which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising the steps of:
   (1) during evaluation of at least a first XPath expression comprising a plurality of steps, an XPath evaluation component identifying a next unmatched step in the plurality of steps;
   (2) the XPath evaluation component sending an event request to an XML event-streaming component;
      wherein the event request includes one or more criteria that specify a characteristic of at least a first XML event that will satisfy the next unmatched step;
      wherein the XML event-streaming component is separate from the XPath evaluation component;
   (3) in response to the event request, the XML event-streaming component streaming an XML event to the XPath evaluation component;
      wherein the XML event-streaming component determines the XML event to stream to the XPath evaluation component based on the specified characteristic of at least the first XML event that will satisfy the next unmatched step;
   (4) the XPath evaluation component matching the XML event to said next unmatched step;
   (5) repeating steps 1-4 with respect to at least a new next unmatched step in the first XPath expression, until the XPath evaluation component determines that there are no remaining unmatched steps in the first XPath expression; and
   (6) outputting an XPath result based at least upon the XML event streamed in the last iteration of step 3;
   wherein the method is performed by one or more computing devices.

2. The method of claim 1 wherein the XML evaluation component is a state machine compiled for at least the XPath expression.

3. The method of claim 2 wherein the state machine maintains state information indicating one or more current states based on previously received XML events, wherein the next unmatched step corresponds to state transitions away from the one or more current states.

4. The method of claim 3 wherein, for each state in the state machine, the state machine stores pre-compiled criteria, wherein the criteria sent from the XPath evaluation component comprises the pre-compiled criteria for the one or more current states, wherein the pre-compiled criteria was generated when the state machine was compiled.

5. The method of claim 3 wherein:
   matching the XML event to said next unmatched step comprises changing the state information to indicate a new one or more current states;
   determining that there are no remaining unmatched steps in the XPath expression comprises determining that a current state is an accepting state; and
   outputting an XPath result comprises:
      the XPath evaluation component receiving one or more events while in the accepting state;
      outputting XML for all XML events received while in the accepting state; and
      receiving a closing XML event that causes the state machine to regress to a non-accepting state.

6. The method of claim 3 wherein the state machine further comprises gamma transitions operating in reverse of the state transitions and based on events that signal the end of an element.

7. The method of claim 2 wherein the state machine is a non-deterministic finite automaton.

8. The method of claim 1 further comprising the steps of:
   inputting one or more XML data sources into the XML event-streaming component; and
   generating the XML event based on an element, attribute, or value the XML event-streaming component parses from the one or more XML data sources.

9. The method of claim 8 wherein the one or more XML data sources is formatted as binary-encoded XML, further comprising the step of:
   prior to generating the XML event, decoding a portion of an XML data source with the XML event-streaming component, wherein the XML event is generated based on an element, attribute, or value in said portion.

10. The method of claim 8, wherein the one or more XML data sources is based on an XML schema, further comprising the steps of, prior to generating an XML event:
    at the XML event-streaming component, determining that, based on the one or more criteria and the XML schema, no XML event matching the one or more criteria may be generated from a portion of an XML data source; and
    skipping the parsing of said portion.

11. The method of claim 1,
    wherein the XML event is an XML SAX event comprising at least one element, attribute, or value;
    wherein the one or more criteria comprise at least the name of an element or attribute, a comparison operation based on a value, or a structural relationship.

12. The method of claim 1, further comprising the steps of, prior to the step of sending one or more criteria from the XPath evaluation component:
    receiving an XML Query;
    normalizing the XML Query to generate the XPath expression; and
    initiating evaluation of the XPath expression by the XPath evaluation component.

13. The method of claim 1, wherein the step of outputting the XPath result comprises:
    the XML evaluation component receiving one or more XML events;

outputting XML for the one or more XML events; and receiving an XML event indicating the end of a particular element, wherein the beginning of the particular element was indicated by the XML event streamed in the last iteration of the step of streaming an XML event from the XML event-streaming component.

14. The method of claim 1, wherein the one or more criteria are further based upon a next unmatched step in one or more additional XPath expressions.

15. The method of claim 14, wherein the XPath expression and the one or more additional XPath expressions are normalized from a same XML Query.

16. The method of claim 1 wherein the evaluation component comprises a compiled representation of the XPath expression, wherein the compiled representation comprises, for each step of the XPath expression, pre-compiled criteria, wherein the one or more criteria sent from the XPath evaluation component comprises the pre-compiled criteria for the next unmatched step.

17. A method for evaluating an XPath expression comprising the computer-implemented steps of:

compiling a state machine based on an XPath expression, the state machine comprising states and transitions that reflect the steps of the XPath expression;

evaluating the XPath expression using the state machine, wherein the step of evaluating comprises, while executing the state machine:

receiving one or more XML events from an XML event-streaming component;

maintaining state information based on the content and ordering of the one or more XML events, wherein the state information indicates a current state in the state machine;

based at least upon transitions from the current state to subsequent states, determining one or more criteria, wherein the one or more criteria describe characteristics of any XML event that will transition the state machine to at least one of the subsequent states;

sending the one or more criteria to the XML event-streaming component;

requesting, from the XML event-streaming component, a next XML event that meets the one or more criteria;

in response to said requesting, receiving an XML event from the XML streaming component that meets the one or more criteria; and generating an XPath result based on the evaluation;

wherein the method is performed by one or more computing devices.

18. A computer-implemented method for evaluating an XML query, comprising the steps of:

compiling a state machine based on one or more XPath expressions;

wherein the state machine comprises a first set of states, a set of transitions, and a set of conditions;

wherein each transition in the set of transitions indicates a transformation from a state in the first set of states to a state in a second set of states;

wherein each condition in the set of conditions describes, for a distinct transition in the set of transitions, one or more criteria under which input received by the state machine will result in the distinct transition; and while executing the state machine in the first set of states:

sending data from the state machine to an XML event-streaming component indicating the set of conditions;

parsing an XML data source with the XML event-streaming component until the XML streaming engine generates an event that meets the one or more criteria of at least one condition in the set of conditions;

sending input from the XML event-streaming component to the state machine indicating the event; and based on the event, transitioning the state machine to a third set of states, wherein the third set of states comprises an accepting state, wherein the state machine outputs the XML event as an XPath result;

wherein the method is performed by one or more computing devices.

19. The method of claim 17, wherein the state machine further comprises gamma transitions operating in reverse of the transitions and based on events that signal the end of an element.

20. The method of claim 17, wherein the state machine is a non-deterministic finite automaton;

wherein the XML event is an XML SAX event comprising at least one element, attribute, or value;

wherein the one or more criteria comprise at least the name of an element or attribute, a comparison operation based on a value, or a structural relationship.

21. The method of claim 17, further comprising:

receiving an XML Query; and normalizing the XML Query to generate the XPath expression.

22. The method of claim 18 wherein the XML data source is formatted as binary-encoded XML, further comprising the step of:

prior to generating the event, decoding a portion of the XML data source with the XML event-streaming component, wherein the event is generated based on an element, attribute, or value in said portion.

23. The method of claim 18, wherein the XML data source is formatted as binary-encoded XML;

wherein at the time the set of conditions is sent to the XML event-streaming component, the XML event-streaming component is positioned at a first point the XML data source;

wherein the method further comprises:

skipping decoding of a portion of the XML data source based on the set of conditions, the portion being located after the first in the XML data source;

resuming decoding of the XML data source at a second point after the skipped portion;

wherein the XML event is generated based on XML data that was decoded after the skipped portion.

24. The method of claim 18, wherein the XML data source is formatted as binary-encoded XML;

wherein the method further comprises skipping decoding of a portion of the XML data source based on the set of conditions and an XML schema associated with the XML data source.

25. The method of claim 18, wherein the XML data source is based on an XML schema, further comprising the steps of, prior to generating an XML event:

at the XML event-streaming component, determining that, based on the set of conditions and the XML schema, no XML event matching the one or more criteria may be generated from a portion of the XML data source; and skipping the parsing of said portion.

26. The method of claim 18, wherein the state machine further comprises transitions operating in reverse of the state transitions and based on events that signal the end of an element.

27. The method of claim 18,
wherein the state machine is a non-deterministic finite automaton;
wherein the XML event is an XML SAX event comprising at least one element, attribute, or value;
wherein the set of conditions comprises at least the name of an element or attribute, a comparison operation based on a value, or a structural relationship.

28. The method of claim 18, further comprising:
receiving an XML Query; and
normalizing the XML Query to generate the XPath expression.

29. One or more non-transitory computer-readable storage media storing instructions that, when executed by one or more computing devices, cause:
(1) during evaluation of at least a first XPath expression comprising a plurality of steps, an XPath evaluation component identifying a next unmatched step in the plurality of steps;
(2) the XPath evaluation component sending an event request to an XML event-streaming component;
wherein the event request includes one or more criteria that specify a characteristic of at least a first XML event that will satisfy the next unmatched step;
wherein the XML event-streaming component is separate from the XPath evaluation component;
(3) in response to the event request, the XML event-streaming component streaming an XML event to the XPath evaluation component;
wherein the XML event-streaming component determines the XML event to stream to the XPath evaluation component based on the specified characteristic of at least the first XML event that will satisfy the next unmatched step;
(4) the XPath evaluation component matching the XML event to said next unmatched step;
(5) repeating steps 1-4 with respect to at least a new next unmatched step in the first XPath expression, until the XPath evaluation component determines that there are no remaining unmatched steps in the first XPath expression; and
(6) outputting an XPath result based at least upon the XML event streamed in the last iteration of step 3;
wherein the method is performed by one or more computing devices.

30. The one or more non-transitory computer-readable storage media of claim 29 wherein the XML evaluation component is a state machine compiled for at least the XPath expression.

31. The one or more non-transitory computer-readable storage media of claim 30 wherein the state machine maintains state information indicating one or more current states based on previously received XML events, wherein the next unmatched step corresponds to state transitions away from the one or more current states.

32. The one or more non-transitory computer-readable storage media of claim 31 wherein, for each state in the state machine, the state machine stores pre-compiled criteria, wherein the criteria sent from the XPath evaluation component comprises the pre-compiled criteria for the one or more current states, wherein the pre-compiled criteria was generated when the state machine was compiled.

33. The one or more non-transitory computer-readable storage media of claim 31 wherein:
matching the XML event to said next unmatched step comprises changing the state information to indicate a new one or more current states;
determining that there are no remaining unmatched steps in the XPath expression comprises determining that a current state is an accepting state; and
outputting an XPath result comprises:
the XPath evaluation component receiving one or more events while in the accepting state;
outputting XML for all XML events received while in the accepting state; and
receiving a closing XML event that causes the state machine to regress to a non- accepting state.

34. The one or more non-transitory computer-readable storage media of claim 31 wherein the state machine further comprises gamma transitions operating in reverse of the state transitions and based on events that signal the end of an element.

35. The one or more non-transitory computer-readable storage media of claim 30 wherein the state machine is a non-deterministic finite automaton.

36. The one or more non-transitory computer-readable storage media of claim 29, wherein the instructions, when executed by the one or more computing devices, further cause:
inputting one or more XML data sources into the XML event-streaming component; and
generating the XML event based on an element, attribute, or value the XML event-streaming component parses from the one or more XML data sources.

37. The one or more non-transitory computer-readable storage media of claim 36 wherein the one or more XML data sources is formatted as binary-encoded XML, wherein the instructions, when executed by the one or more computing devices, further cause:
prior to generating the XML event, decoding a portion of an XML data source with the XML event-streaming component, wherein the XML event is generated based on an element, attribute, or value in said portion.

38. The one or more non-transitory computer-readable storage media of claim 36, wherein the one or more XML data sources is based on an XML schema, wherein the instructions, when executed by the one or more computing devices, further cause, prior to generating an XML event:
at the XML event-streaming component, determining that, based on the one or more criteria and the XML schema, no XML event matching the one or more criteria may be generated from a portion of an XML data source; and
skipping the parsing of said portion.

39. The one or more non-transitory computer-readable storage media of claim 29,
wherein the XML event is an XML SAX event comprising at least one element, attribute, or value;
wherein the one or more criteria comprise at least the name of an element or attribute, a comparison operation based on a value, or a structural relationship.

40. The one or more non-transitory computer-readable storage media of claim 29, wherein the instructions, when executed by the one or more computing devices, further cause, prior to the step of sending one or more criteria from the XPath evaluation component:
receiving an XML Query;
normalizing the XML Query to generate the XPath expression; and initiating evaluation of the XPath expression by the XPath evaluation component.

41. The one or more non-transitory computer-readable storage media of claim 29, wherein the step of outputting the XPath result comprises:
   the XML evaluation component receiving one or more XML events;
   outputting XML for the one or more XML events; and
   receiving an XML event indicating the end of a particular element, wherein the beginning of the particular element was indicated by the XML event streamed in the last iteration of the step of streaming an XML event from the XML event-streaming component.

42. The one or more non-transitory computer-readable storage media of claim 29, wherein the one or more criteria are further based upon a next unmatched step in one or more additional XPath expressions.

43. The one or more non-transitory computer-readable storage media of claim 42, wherein the XPath expression and the one or more additional XPath expressions are normalized from a same XML Query.

44. The one or more non-transitory computer-readable storage media of claim 29 wherein the evaluation component comprises a compiled representation of the XPath expression, wherein the compiled representation comprises, for each step of the XPath expression, pre-compiled criteria, wherein the one or more criteria sent from the XPath evaluation component comprises the pre-compiled criteria for the next unmatched step.

45. One or more non-transitory computer-readable storage media storing instructions that, when executed by one or more computing devices, cause:
   compiling a state machine based on an XPath expression, the state machine comprising states and transitions that reflect the steps of the XPath expression;
   evaluating the XPath expression using the state machine, wherein the step of evaluating comprises, while executing the state machine:
      receiving one or more XML events from an XML event-streaming component;
      maintaining state information based on the content and ordering of the one or more XML events, wherein the state information indicates a current state in the state machine;
      based at least upon transitions from the current state to subsequent states, determining one or more criteria, wherein the one or more criteria describe characteristics of any XML event that will transition the state machine to at least one of the subsequent states;
      sending the one or more criteria to the XML event-streaming component;
      requesting, from the XML event-streaming component, a next XML event that meets the one or more criteria;
      in response to said requesting, receiving an XML event from the XML streaming component that meets the one or more criteria; and
   generating an XPath result based on the evaluation;
   wherein the method is performed by one or more computing devices.

46. One or more non-transitory computer-readable storage media storing instructions that, when executed by one or more computing devices, cause:
   compiling a state machine based on one or more XPath expressions;
      wherein the state machine comprises a first set of states, a set of transitions, and a set of conditions;
      wherein each transition in the set of transitions indicates a transformation from a state in the first set of states to a state in a second set of states;
      wherein each condition in the set of conditions describes, for a distinct transition in the set of transitions, one or more criteria under which input received by the state machine will result in the distinct transition; and
   while executing the state machine in the first set of states:
      sending data from the state machine to an XML event-streaming component indicating the set of conditions;
      parsing an XML data source with the XML event-streaming component until the XML streaming engine generates an event that meets the one or more criteria of at least one condition in the set of conditions;
      sending input from the XML event-streaming component to the state machine indicating the event; and
      based on the event, transitioning the state machine to a third set of states, wherein the third set of states comprises an accepting state, wherein the state machine outputs the XML event as an XPath result;
   wherein the method is performed by one or more computing devices 47. The one or more non-transitory computer-readable storage media of claim 45, wherein the state machine further comprises gamma transitions operating in reverse of the transitions and based on events that signal the end of an element.

48. The one or more non-transitory computer-readable storage media of claim 45,
   wherein the state machine is a non-deterministic finite automaton;
   wherein the XML event is an XML SAX event comprising at least one element, attribute, or value;
   wherein the one or more criteria comprise at least the name of an element or attribute, a comparison operation based on a value, or a structural relationship.

49. The one or more non-transitory computer-readable storage media of claim 45, wherein the instructions, when executed by the one or more computing devices, further cause:
   receiving an XML Query; and
   normalizing the XML Query to generate the XPath expression.

50. The one or more non-transitory computer-readable storage media of claim 46, wherein the XML data source is formatted as binary-encoded XML, wherein the instructions, when executed by the one or more computing devices, further cause:
   prior to generating the event, decoding a portion of the XML data source with the XML event-streaming component, wherein the event is generated based on an element, attribute, or value in said portion.

51. The one or more non-transitory computer-readable storage media of claim 46,
   wherein the XML data source is formatted as binary-encoded XML;
   wherein at the time the set of conditions is sent to the XML event-streaming component, the XML event-streaming component is positioned at a first point the XML data source;
   wherein the wherein the instructions, when executed by the one or more computing devices, further cause:
      skipping decoding of a portion of the XML data source based on the set of conditions, the portion being located after the first in the XML data source;

resuming decoding of the XML data source at a second point after the skipped portion;

wherein the XML event is generated based on XML data that was decoded after the skipped portion.

52. The one or more non-transitory computer-readable storage media of claim 46, wherein the XML data source is formatted as binary-encoded XML;

wherein the instructions, when executed by the one or more computing devices, further cause skipping decoding of a portion of the XML data source based on the set of conditions and an XML schema associated with the XML data source.

53. The one or more non-transitory computer-readable storage media of claim 46, wherein the XML data source is based on an XML schema, wherein the instructions, when executed by the one or more computing devices, further cause, prior to generating an XML event:

at the XML event-streaming component, determining that, based on the set of conditions and the XML schema, no XML event matching the one or more criteria may be generated from a portion of the XML data source; and skipping the parsing of said portion.

54. The one or more non-transitory computer-readable storage media of claim 46, wherein the state machine further comprises transitions operating in reverse of the state transitions and based on events that signal the end of an element.

55. The one or more non-transitory computer-readable storage media of claim 46, wherein the state machine is a non-deterministic finite automaton;

wherein the XML event is an XML SAX event comprising at least one element, attribute, or value;

wherein the set of conditions comprises at least the name of an element or attribute, a comparison operation based on a value, or a structural relationship.

56. The one or more non-transitory computer-readable storage media of claim 46, wherein the instructions, when executed by the one or more computing devices, further cause:

receiving an XML Query; and normalizing the XML Query to generate the XPath expression.

* * * * *

UNITED STATES PATENT AND TRADEMARK OFFICE
CERTIFICATE OF CORRECTION

| | | |
|---|---|---|
| PATENT NO. | : 8,250,062 B2 | Page 1 of 1 |
| APPLICATION NO. | : 11/938017 | |
| DATED | : August 21, 2012 | |
| INVENTOR(S) | : Zhang et al. | |

It is certified that error appears in the above-identified patent and that said Letters Patent is hereby corrected as shown below:

On title page 3, in column 1, under "Other Publications", line 28, delete "Pulished" and insert -- Published --, therefor.

On title page 3, in column 2, under "Other Publications", line 7, delete "SIGMOND" and insert -- SIGMOD --, therefor.

On title page 3, in column 2, under "Other Publications", line 37, delete "Non Final" and insert -- Final --, therefor.

In the Specifications:

In column 14, line 41, delete "Using" and insert -- Using A --, therefor.

In the Claims:

In column 22, line 16, in Claim 33, delete "non- accepting" and insert -- non-accepting --, therefor.

In column 24, line 25, in Claim 46, delete "devices" and insert -- devices. --, therefor.

In column 24, line 63, in Claim 51, before "wherein the" delete "wherein the".

Signed and Sealed this
Fourteenth Day of May, 2013

Teresa Stanek Rea
*Acting Director of the United States Patent and Trademark Office*